United States Patent [19]
Varichon

[11] 3,792,882
[45] Feb. 19, 1974

[54] DEVICE FOR CONSTRUCTING LIGHT TUBULAR STRUCTURES

[75] Inventor: Jacques-Henry Varichon, Paris, France

[73] Assignee: Pierre Robert Paul Fredon, Paris, France; a part interest

[22] Filed: Mar. 16, 1972

[21] Appl. No.: 235,389

Related U.S. Application Data

[63] Continuation-in-part of Ser. No. 73,078, Sept. 17, 1970, abandoned.

[30] Foreign Application Priority Data
Sept. 17, 1969 France .............................. 6931541

[52] U.S. Cl. ................. 403/171, 35/18 A, 403/217
[51] Int. Cl. .............................................. F16b 7/00
[58] Field of Search ...... 46/27, 28, 29; 35/18 A, 34; 287/54 A, 54 B, 54 C

[56] References Cited
UNITED STATES PATENTS

| | | | |
|---|---|---|---|
| 1,400,066 | 12/1921 | Huck | 46/29 |
| 2,150,651 | 3/1939 | Ewing | 287/54 C |
| 1,817,775 | 8/1931 | Sipe | 287/54 C |
| 3,211,481 | 10/1965 | Cadovius | 287/54 B |
| 3,021,159 | 2/1962 | Back | 46/29 X |
| 2,090,863 | 8/1937 | Feykert | 287/54 C |

FOREIGN PATENTS OR APPLICATIONS

| | | | |
|---|---|---|---|
| 1,489,468 | 6/1967 | France | 287/54 A |
| 1,281,767 | 12/1961 | France | 46/29 |
| 108,954 | 5/1925 | Switzerland | 46/29 |

*Primary Examiner*—Andrew V. Kundrat
*Attorney, Agent, or Firm*—William J. Daniel

[57] ABSTRACT

This invention concerns a construction device relating to light scaffold units, intended for display units in the furnishing and decorating field.

The construction device comprises a plurality of tubes extending in different directions and a plurality of complex junction units for connecting said tubes together at points in the assembly, each of said tubes being made of sheet or band roll of metal curved into tubular configuration with a longitudinal slot extending the entire length thereof and each of said complex junction units comprising a spherical hub part and a plurality of cylindrical stubs brazed or welded radially to the spherical hub part, said stubs being adapted for a coaxial telescoping fit with the tubes connected at the junction and having a cross-section slightly greater than the normal internal cross-section of the tubes so that they fit within the tubes with a resilient deformation of the tubes.

7 Claims, 5 Drawing Figures

PATENTED FEB 19 1974  3,792,882
SHEET 1 OF 2
FIG.: 1
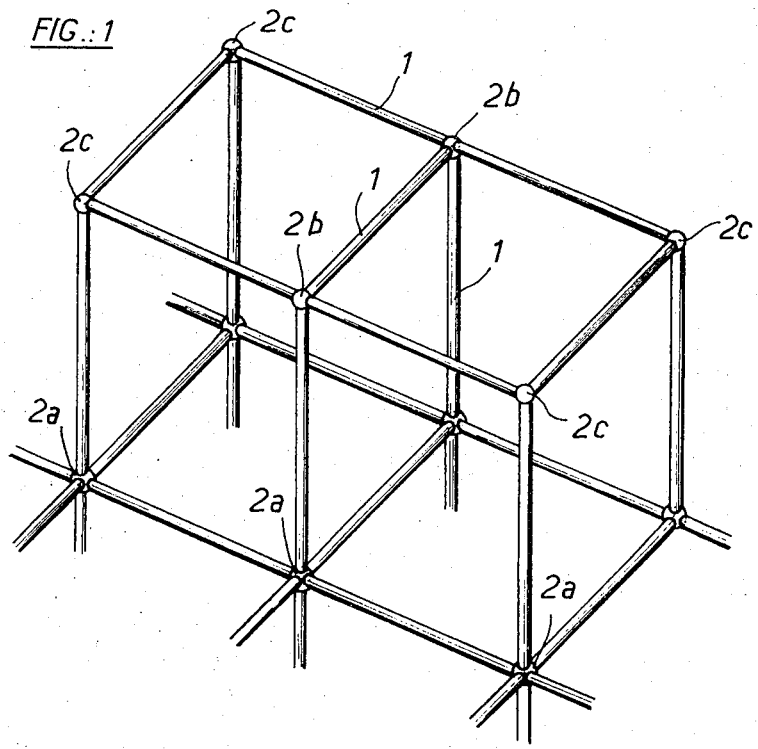
FIG.: 2
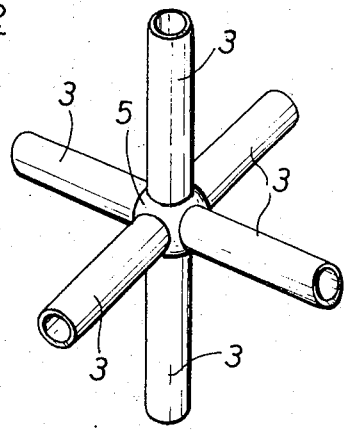
FIG.: 3
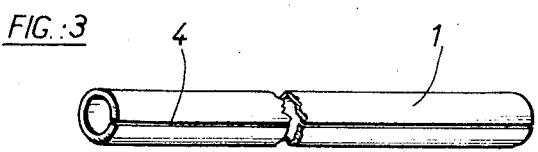

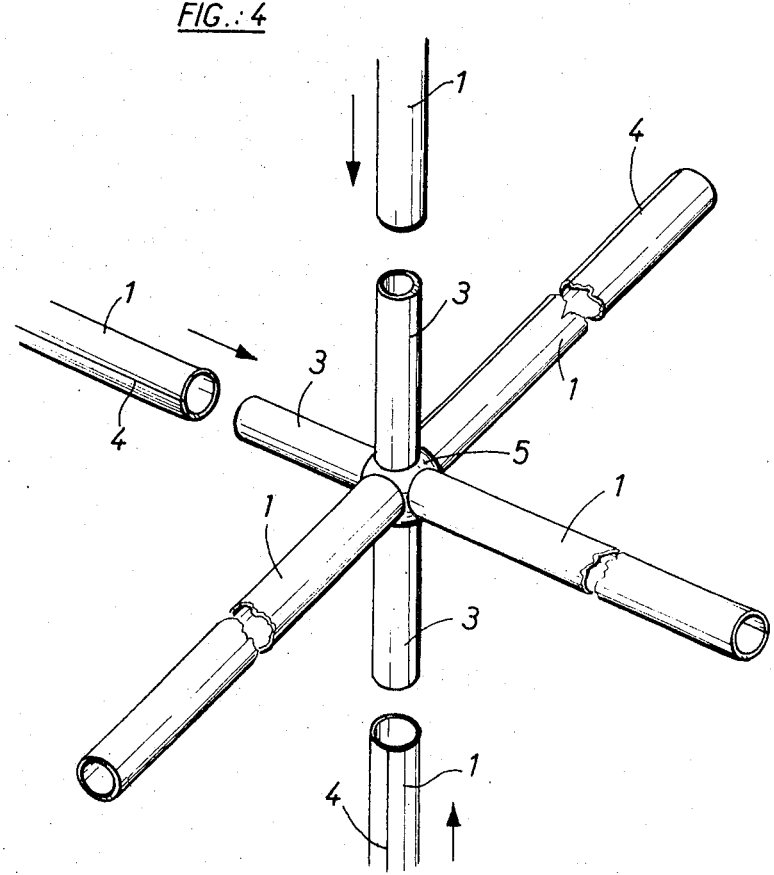
FIG.:4
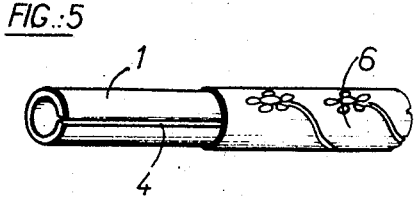
FIG.:5

DEVICE FOR CONSTRUCTING LIGHT TUBULAR STRUCTURES

The present application constitutes a continuation-in-part of patent application Ser. No. 73,078, filed Sept. 17, 1970 now abandoned. This invention concerns a construction device relating to light scaffold units comprising tubes connected together and intended for display units in the furnishing and decorating field.

In scaffold units of this type which are known at the present time three categories can be distinguished:

in the first category, the tubes are assembled by means of calibrated coupling the cross-sections of which are homothetic with that of the tubes and over which they are fitted by force;

in the second category, the couplings or the tubes themselves are fitted with an expansion system or a cam-actuated system which provides a clamping action between the tubes and the couplings;

in the third category, that falls into the plaything field, tubes are slip over stubs so as to obtain a more or less loose and fragile assembly.

The system under the first category has one drawback resulting from the difficulty of precisely calibrating the tubes and the couplings, a drawback that is all the more pronounced in that two pieces initially properly calibrated no longer are so after having once been put together and then dismantled (the system thus in practice does not allow reassembly with the original advantages).

The second category of system is complex because at every location where there is a junction between a tube and a coupling it is necessary to use a clamping device, a feature which furthermore increases the manufacturing cost.

The third category relates to construction toy sets for children which have been devised, as is well known, with tubes which may be assembled together at will by means of hubs provided with screwed stubs. The children have no difficulty to slip on the tubes over said stubs and thus they erect structures according to their fancy. Assembly and disassembly of them is quickly obtained, especially if at least some of said tubes are provided with longitudinal splits or slots.

In contradistinction to such toys, the invention has for its object a real construction device, capable of supporting relatively great loads and withstanding the action of outside corroding agents; said device is made of components selected in order to be usable for building a structure that fulfils contradictory requisites, viz they must be as cheap and light as possible without impairing strength and solidity, and also they must be adaptable for assembly as easily as possible in spite of their relatively great weight. This means that some characteristics of the above mentioned toy may be adopted, but in addition thereto special measures have to be taken for obtaining the effects wanted.

As a matter of fact while it is useful for said toys to be easily assembled and disassembled and a protection against ambient atmosphere has not to be stringently established, this is not the case in the real construction field.

One object of the invention is to obtain a scaffold unit or construction device which is conceived so as to guard against the drawbacks of the first two categories.

Another object of the invention is to build a construction device which is strong and rigid, although cheap and light.

Another object of the invention is to provide a construction device which offers a decorative effect of its own.

An object of the invention is a construction assembly obtained by combining a plurality of tubes extending in different directions and a plurality of complex junction units for connecting said tubes together at points in the assembly, whereas each of said tubes is made of sheet or band roll of metal curved into tubular configuration with a longitudinal slot extending the entire length thereof and each of said complex juntion units comprises a spherical hub part and a plurality of cylindrical stubs brazed or welded radially to the spherical hub part, said stubs fitting resiliently within the tubes. Said slotted tubes are preferably made of steel, with an appropriate cross-section so as to have a good clamping action.

Since the said clamping action is effected by simple resilient deformation, the necessity for any complicated clamping device is eliminated, and since, furthermore, the resilient deformation disappears when the fitting is taken apart, the device can be dismantled after which the units are in the state they were in before being assembled.

In a preferred embodiment of the invention the tubes, made of a resilient material such as steel, for example, are split lengthwise along a geometrical generatrix in such a way as to facilitate a resilient expansion in their cross-section which, prior to fitting being effected, is slightly less than the cross-section of the stubs or couplings. This embodiment is simple to construct and leads to a distinctly low cost of manufacture since, because of the existence of the slit, the pipes do not have to be fabricated with a high degree of accuracy. Their initial cross-section has to be smaller than that of the couplings or stubs and it is useful that the shapes of the cross-sections of the stubs and of the mating tube are respectively different and so shaped as to obtain mutual tangency of the two cross-sections along several distinct generatrix lines of the tube cylinder.

It is known that in some assemblies of scaffolding or like structures use is made of sleeves that are screwed onto a hub in the form of a ball. It is also known that in other instances tubes may be welded or brazed together for obtaining scaffolding structures. In the first case the tube axes do not automatically and necessarily run through the center of the ball. Moreover it is known that spherical hub boring and threading processes rise up many problems. Besides it is to be noticed that the spherical surface of the ball will be partially exposed in places that do not correspond to the assembling directions, this being detrimental to the aesthetic appearance of the assembly. In the second case one end of the tube is necessarily submitted to a cutting in or like operation so as to produce a tube section which is adapted to follow closely the spherical surface of the ball hub; it is clear that this is difficult to carry out and entails a rise in the manufacturing cost.

In the case of the invention the simultaneous use of the welding or brazing of a circular section ended tube onto a spherical surface will rise no problem, for the intersection of the cylinder (or tube) and the sphere (or ball) is then admitted to be a circle and consequently there will be no positioning or adjustment to be made, this being automatically obtained.

It may still be remarked that the assembling according to the invention may be carried out under any angle whatever.

Besides the exposed part of the ball presents a decorative effect of its own.

The following description with reference to the accompanying drawings, which is given by way of non-limitative example, brings out how the invention may be put into effect. In the drawings:

FIG. 1 illustrates a perspective view of one part of a tubular scaffold unit according to the invention, FIG. 2 shows, also in perspective but to a larger scale, the combination of the couplings or stubs rigidly interlinked to form one of the complex junctions of the unit for assembly purposes, FIG. 3 shows one of the tubes split along a geometrical generatrix, FIG. 4 is a perspective view illustrating the assembling of the tubes and of the stubs at one of the complex junctions, and FIG. 5 shows one of the tubes surrounded by a plastic sheath. The light tubular scaffold unit illustrated in FIG. 1, which scaffold unit may for example be employed to form a display frame, more especially in a shop, an exhibition, etc., comprises tubes 1 which extend in different directions and which are interconnected at points 2a, 2b, 2c which constitute the junctions for assembly purposes.

At each of the said points 2a, 2b, 2c there is located a coupling unit of the type illustrated in FIG. 2, this including cylindrical stubs or couplings 3, either hollow as shown or solid, equal in number to that of the tubes terminating at the junction under consideration and set coaxially with those tubes. These stubs or couplings 3 are rigidly interlinked.

The coupling unit illustrated in FIG. 2 thus includes six stubs 3 which are arranged in pairs with the stubs of each pair axially opposed and the pairs at right angles to each other. This unit is therefore suitable for the complex junction 2a of FIG. 1 at which six tubes 1 terminate. But in that coupling unit there could be a different number of stubs according to the number of tubes interconnected at the corresponding junction. Thus, for the junctions 2b in FIG. 1 there will be only four stubs, whereas for the junctions 2c there will be three of them.

The tubes 1 are made of a resilient metal and are provided with a slit 4 (FIG. 3) running the length of a generatrix in such a way that, by virtue of the said slit, their cross-section is able to expand resiliently. These tubes may, for example, be made from a sheet of steel bent over into a circular form (a cold-shaped tube) with an internal diameter as regards these tubes slightly less than the external diameter of the stubs 3. The fitting of a tube over the corresponding stub (see FIG. 4) at a junction to effect assembly is therefore accompanied by a resilient expansion of the cross-section of the tube, and the latter therefore comes to grip resiliently around the stub over the entire length of the latter, thus ensuring cohesion of the assembly.

It is appropriate to note that it is sufficient for the diameter of the tubes to be slightly less than that of the stubs, without it being necessary to achieve great accuracy as regards the difference in the diameters. This avoidance of the necessity for accurate calibration, added to the fact that the tubes are neither welded nor drawn but are cold-formed from a strip by merely bringing the two opposite edges together, achieves a relatively low manufacturing cost while permitting the use of metal which is difficult to heat-treat, such as for example stainless steel. Also, the scaffold unit can be dismantled and may be used again after dismantling, since the tubes are resilient and hence their cross-section contracts to normal after dismantling.

FIG. 2 shows a particularly advantageous embodiment of coupling unit. In this embodiment, the stubs 3 are of cylindrical shape and are welded or brazed on to a ball or sphere 5. By this means any complicated machining of the stubs at their joining points is avoided, and use may be made of stubs that are identical inter se, to whatever number required, while giving each stub the desired direction, adequate accuracy being maintained in the angles that the sleevelike stubs should form between each other.

However, the scope of the invention would not be exceeded if different arrangements were employed. For example, the resilient clamping of the tubes over the stubs could be arrived at by using stub sleeves with a circular cross-section and tubes with a slightly elliptical cross-section, or vice versa, the smaller axis of the elliptical shape being of a length slightly less than the diameter of the circle.

In such an embodiment an additional advantage is obtained namely that during the jointing and the elastic deformation of at leest one of the cross-sections the tangency of the two cross-section lines is ensured at several places where said lines are pressed against each other.

The tubes 1 are advantageously surrounded by a continuous plastics sheath 6 (FIG. 5) which fits snugly over the tube or adheres thereto. The material of this sheath will be any one well known and used in the field of plastics, for example polyvinylchloride, rilsan, etc., and will possess a certain resilience. This sheath may have the form of a distinct plastic thermoretractable tube into which the slit metal tube is threaded or the form of a plastified layer obtained through a die extruding process. Said sheath serves several purposes.

First of all it completely encircles the metal tube 1, so that it masks the slots 4 and gives the junctions between hubs a neat appearance; moreover dust cannot enter the tubes and the sheath protects the metal tubes against corrosion effects. The outward appearance may be that of a transparent or translucid envelope or better, it may still be enhanced by having colored material for the sheath, that is to say that its exterior surface may be tinted in white or other color, or shaded, or even present decorative configurations of its own. And also a sheath of plastics is cheap and easily available. But another advantage of the sheath, and not the less important in this case, is that the resistance of the structure to dismantlement is still improved. For on the one hand the slit tube is tightened by the resilient sheath and thus its rigidity is increased. On the other hand the air trapped within the stubs and the junction tubes escapes only with difficulty, and thanks to the elasticity of the sheaths, when the assembly is completed, the sheaths being pushed with the tubes towards and against the hubs and the stubs acting as pistons. If disassembling is then strived at by pulling the two elements apart, a depression is created within the tube, which opposes this action.

Naturally the material of the sheath may be also brass (instead of plastics) and the sheath will have a sufficient diameter to allow the elastic deformation of the tube. However, plastics is to be preferred for gaining completely all the advantages mentioned.

What I claim is:

1. A construction assembly, especially for light tubular scaffold units, comprising, in combination, a plurality of tubes extending in different directions and a plurality of complex junction units for connecting said tubes together at points in the assembly, each of said tubes being made of sheet or band roll of metal curved into tubular configuration with a longitudinal slot extending the entire length thereof and each of said complex junction units comprising a spherical hub part and a plurality of cylindrical stubs brazed or welded radially to the spherical hub part, said stubs being adapted for a coaxial telescoping fit with the tubes connected at the junction and having a cross-section slightly greater than the normal internal cross-section of the tubes so that they fit within the tubes with a resilient deformation of the tubes, the shapes of the cross-sections of the stubs and of the mating tube respectively being different and so shaped as to obtain mutual tangency of the two cross-sections along several distinct generatrix lines of the tube cylinder.

2. A construction device according to claim 1 in which the shape of the cross-section of a stub is elliptical and the shape of the mating tube is circular.

3. A construction device according to claim 1 in which the shape of the cross-section of a stub is circular and the shape of the mating tube is elliptical.

4. A construction assembly, especially for light tubular scaffold units, comprising, in combination, a plurality of tubes extending in different directions and a plurality of complex junction units for connecting said tubes together at points in the assembly, each of said tubes being made of sheet or band roll of metal curved into tubular configuration with a longitudinal slot extending the entire length thereof and each of said complex junction units comprising a spherical hub part and a plurality of cylindrical stubs brazed or welded radially to the spherical hub part, said stubs being adapted for a coaxial telescoping fit with the tubes connected at the junction and having a cross-section slightly greater than the normal internal cross-section of the tubes so that they fit within the tubes with a resilient deformation of the tubes, said tubes being enclosed in a continuous sheath of plastics material which fits snugly over the tube or adheres thereto.

5. A construction device according to claim 4, in which the material of the sheath is at least partially light-transmitting.

6. A construction device according to claim 4, in which the exterior surface of the sheath is at least partially colored.

7. A construction device according to claim 4, in which the exterior surface of the sheath is provided with decorative configurations.

* * * * *